Aug. 25, 1953     S. A. STERNBERGH ET AL     2,649,647
TOOLHOLDER
Filed Aug. 25, 1949
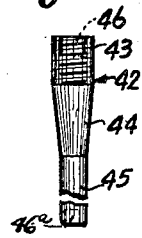
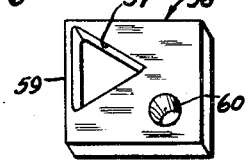
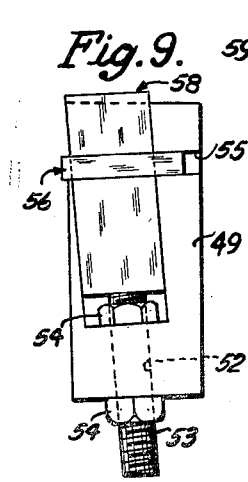
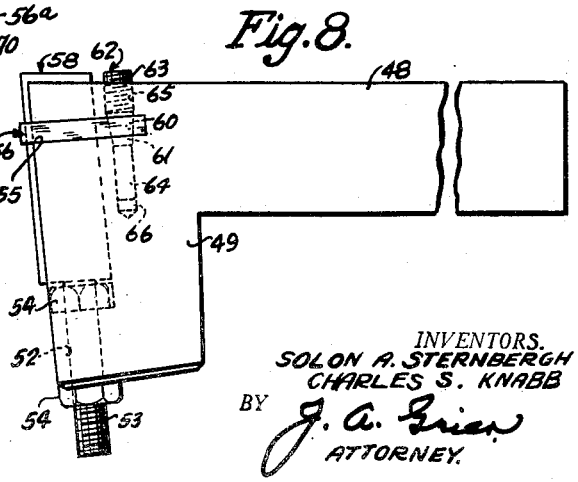
INVENTORS.
SOLON A. STERNBERGH
CHARLES S. KNABB
BY J. A. Grier
ATTORNEY.

Patented Aug. 25, 1953

2,649,647

UNITED STATES PATENT OFFICE 2,649,647

TOOLHOLDER

Solon A. Sternbergh, Wyomissing Hills, and Charles S. Knabb, Stony Creek Mills, Pa., assignors, by mesne assignments, to West Shore Manufacturing Co., Reading, Pa., a corporation of Pennsylvania Application August 25, 1949, Serial No. 112,324

13 Claims. (Cl. 29—96)

This invention relates to improvements in tool holders and has for a principal object the provision of a tool holder in which the tool bit is rigidly supported, easily removable, and readily adjustable.

Another object of the invention is the provision, in a tool holder, of a surface conforming to a portion of the outer surface of the tool bit and against which said bit is held in non-embracing relation by separate means.

A further object of the invention is the provision, in a tool holder, of a surface conforming to a portion of the surface of the tool bit against which said bit is removably held, a tool-embracing member carried by said holder, a single means cooperating with said member for rigidly holding said bit against said surface, and backing-up means in contact with the lower end of said bit.

Yet another object of the invention is the provision, in a tool holder, of a head end having a surface formed thereon in conformity with a portion of the surface of a tool bit, whereby the latter may engage but not be embraced by said surface, means slidably mounted in said head and having at least two spaced passages therein, one of which said bit extends through, and drift key means cooperating with the other passage in said slidable means for forcing said bit into tractile engagement with said surface.

Other objects and advantages of the invention will be apparent to those skilled in the art upon a study of this specification and the accompanying drawings.

Referring to the drawings which show by way of example two practical embodiments of the invention:

Figure 1 is a plan view of a tool holder made according to the invention for round or cylindrical tool bits;

Figure 2 is a side elevation of the tool holder of Figure 1, showing the cooperative relation of the several parts;

Figure 3 is an end elevation of our new clamping member, which in this embodiment may be termed clamping block;

Figure 4 is a sectional elevation taken along the lines 4—4 of Figure 3, and Figure 4a is a modification of the same;

Figure 5 is an elevation of one form of round tool bit;

Figure 6 is an elevational view of our tapered locking screw for locking the clamping member and the tool bit in the holder;

Figure 7 is a plan view of our tool holder for use with tool bits of triangular cross-section;

Figure 8 is a side elevation of the holder of Figure 7 showing the cooperative relation of the several parts;

Figure 9 is an end elevation of the tool holder of Figures 7 and 8 as seen from the left end of Figure 8;

Figure 10 is a perspective view of the form of clamping member which we employ for securing the triangular tool bit in the holder; and Figure 10a is a modified form of the clamping member shown in Figure 10.

Referring first to Figures 1 and 2, our new and improved tool holder has a shank portion 20, and preferably formed integral therewith is a head portion 21. A round hole or passage 22 extends into the holder body from one outer corner of the head 21. The passage is angular with respect to the central axis of the holder, as seen in Figure 1, and is angular with respect to the horizontal plane, as seen in Figure 2. The corner of the head is cut away and has a curved concave surface 23 formed thereon which extends from the upper surface 24 of the head to the passage 22. This is the surface against which the bit is forced in a manner to be presently described. One edge of the curved surface 23 joins a convex surface 25 which blends into the side surface 26 of the head, while the other edge of the surface 23 joins a convex surface 26 which blends into the surface 27 of the end of the head 21.

A hole extending downwardly in the head from the passage 22 to the lower end of said head has a round passage 28 to accommodate the lower portion of a tool bit 30, and an internally threaded portion 29 to accommodate a "backing-up" screw 31 which may have a head 35 and which may be also provided with a lock nut 36. Spaced apart from the axis of the tool bit 30 is the axis of aligned passages 32 and 33. The passage 32 is internally threaded and extends from the upper surface 24 to the passage 22, while the passage 33 extends from the passage 22 downwardly through said head to an undercut surface 34 on the lower end of said head.

Slidably positioned in the passage 22 is a clamping member or block 37 which has a hole 38 therein to accommodate the tool bit 30. Spaced apart from the hole 38 is a tapered hole 39. The bit end of the block 37 has an angular surface 40, which is comparatively thin and which is adapted to clear the work. The opposite end 41 has a somewhat rounded apex and at least one portion approaching parallelism with the right side of the holder.

In Figure 6 we show what we term a tapered locking pin 42, which has a threaded portion 43, a central tapered portion 44, and pilot or shank portion 45. The outer end of the threaded portion 43 has a polygonal socket 46 therein. The threaded portion 43 cooperates with the threaded hole 32, the tapered portion 44 cooperates with the tapered hole 39 in the member 37, and the shank portion 45 cooperates with the hole 33 in the head 21.

To assemble the tool holder, the block 37 is slid into the passage 22, preferably from the left hand corner, with the end 40 as the trailing end. When the hole 38 is aligned with the passage 28, the bit 30 is inserted in the hole 38 and is lowered therein until the lower end abuts the upper end of the screw 31. Then the tapered locking pin 42 is inserted in the hole 32, shank end first until the threaded portion 43 engages the threads in the hole 32. Then with a wrench engaging the hole 46, the locking pin may be screwed down until the tapered portion 44 cooperates with the tapered hole 39 and forces the block 37 endwise (in the direction of the arrow in Figure 1) and forces the bit 30 into tractile engagement with the surface 23.

This method of clamping gives greater rigidity to the tool bit 30 than any other method we know of. By virtue of the tapered locking pin 42 a greater clamping force is derived for a given torque applied to said locking pin, therefore our tools give longer and superior results than tools on the market which are less rigid.

To adjust the height of the upper end of the tool bit, the locking pin 42 may be backed off to lessen the pressure against the surface 23, then the lock nut 36 is loosened and the screw 31 may be screwed in, thereby raising the upper end of the bit 30. If the bit is to be lowered, the locking pin 42 is backed off sufficiently to allow the bit to move when pressure is exerted on the upper end, then the screw 31 is screwed outwardly while exerting pressure on the upper end of the bit to cause it to follow the screw. In either event, when the adjustment desired is obtained, the lock nut is tightened against the surface 34, and the locking pin 42 is again screwed down to force the tool bit into tractile engagement with the surface 23.

In the form of device shown in Figures 7 to 10 inclusive, the holder has a shank portion 48 and a head 49 preferably formed integral therewith. This holder is provided for tools of triangular cross-section. A V-shaped groove having surfaces 50 and 51 is formed in the head end of the holder adjacent to one corner thereof in accordance with whether the holder is to be right hand or left hand. This groove, as may be seen in Figure 9, is angular with respect to the central vertical plane of the holder. Communicating with the lower end of this groove is a threaded hole 52 which accommodates a backing-up screw 53 which may be provided with one or more lock nuts 54.

Extending into the holder from the head end of the holder is a slot 55 which cuts the V-shaped groove 50, 51 and which is disposed at 90° with respect to the axis of said groove. Slidably positioned in the slot 55 is a locking member in the form of a plate 56, which may be best seen in Figure 10. This locking plate has a triangular passage 57 formed therein for a triangular tool bit 58. The web 59 along the left edge of the plate 56, as seen in Figure 10, is made narrow to clear the work. Also formed in the plate 56 is a tapered hole 60 which is engaged by the tapered portion 61 of a locking pin 62, which is similar to the tapered pin 42 described above and shown in Figure 6. The pin 62 also has a threaded portion 63 which engages a threaded hole 65 formed in the head 49, and a shank portion 64 which engages a hole 66 which is in axial alignment with the threaded hole 65.

In assembling this holder, the procedure is substantially the same as described above: The plate 56 is positioned in the slot 55, then the bit 58 is inserted in hole 57 and lowered until it bottoms on the screw 53. The locking pin 62 is inserted in the hole 65 so that the shank 64 passes via the tapered hole 60 and into the hole 66. When the pin has been inserted far enough for the threads on the portion 63 to engage the threads in hole 65, a suitable wrench may be inserted into a polygonal hole 67 in the end of the locking pin for screwing it down into said head. As this is done, the tapered portion 61 engaging the hole 60 in the plate 56 forces it in a direction to, in turn, effect tractile engagement of the tool bit 58 with the surfaces 50 and 51. By means of the set screw 53, the height of the tool bit 58 may be adjusted, in substantially the same manner as described in connection with the first holder.

By employing the locking pin and locking member described herein, modifying the locking member, and modifying the engageable surfaces on the holder accordingly, holders employing our method may be devised for other shapes and styles of tool bits.

In some types of holders we intend to make the locking pin, such as the locking pin 42 of Figures 1 and 2, with a second polygonal socket, such as that shown at 46, formed in the other end thereof and shown at 46a, so that when the holder is in such position that one of them is inaccessible, the other one can be used.

The locking plate or member 37a shown in Figure 4a is a modification of the form shown in Figures 1, 3 and 4, wherein the material between the bit-embracing surface 38a and the engageable surface 39a with which the locking pin cooperates is cut out leaving said surfaces joined together by surfaces 67 and 68 to form an elongated opening. This feature simplifies the assembly of the bit in the holder and usually forms a stronger locking plate because it is easier to harden, and the absence of the web of material between the holes eliminates chances of having certain stresses and strains in the plates after they are hardened and ground.

Referring now to Figure 10a, a similar modification of the locking plate of Figure 10 is shown at 56a, and the material between the bit opening and the hole for the locking pin is cut away along lines 69 and 70, for example, so that the surfaces 57a, 70, 60a, 69, and 59a form a single opening in the plate 56a which functions to partially embrace the tool bit, and to present an engageable surface to cooperate with the camming surface of the locking pin. For the reasons given above in respect to Figure 4a, these locking plates are easier to make, and they are substantially stronger.

Although we have herein shown and described two forms of the invention, we do not propose to be limited to the specific details herein shown and described, as many changes may be made, in the arrangements disclosed, within the scope of the following claims.

What is claimed is:

1. In a tool holder, a body having a surface formed on one end thereof to conform to and adapted to partially embrace a tool bit, a passage formed in said body angular with respect to and communicating with said surface, a clamping member adapted to be positioned in said passage, said clamping member having spaced lateral holes therein, one of which is adapted to receive said bit, and locking means mounted in said body and cooperating with the other of said holes for forcing said clamping means endwise in a direction to positively force said bit against said surface.

2. In a tool holder, a body having a surface formed on one end thereof conforming to and adapted to partially embrace a tool bit, a passage extending from said surface into said body, a hole in said body substantially parallel to and spaced apart from said surface, a clamping member adapted to be positioned in said passage, spaced parallel holes formed in said clamping member, one of said holes being adapted to accommodate said bit and the other of said holes being in axial alignment with the hole in said body when said surface is contacted by said bit, and locking means positioned in the axially aligned holes for moving said clamping member to a position where said last holes are misaligned, thereby forcing said tool bit against said surface.

3. In a tool holder, a body having a surface formed on one corner thereof conforming to and adapted to partially embrace a tool bit, a passage extending from said surface into said body angular with respect to a central vertical plane therein, a hole extending downwardly into said body in spaced parallel relation to said surface, a clamping member slidably positioned in said passage and having spaced holes therein having their axes parallel, one of said holes being shaped to receive said tool bit and the other having a surface therein to be engaged for locking said bit into tractile engagement with said firstmentioned surface, and locking means positioned in the downwardly extending hole in said body and having a portion thereof in cooperative relation with said second-mentioned surface.

4. A tool holder according to claim 3, in which said other hole in said clamping member is tapered, and in which said locking means is a drift pin having said portion tapered and having at least another portion threadedly engaging said downwardly extending hole.

5. In a tool holder, a shank having a head thereon, said head having a portion of its surface formed to conform to a portion of the surface of a tool bit, whereby the latter may engage said surface in non-embracing relation, means slidably mounted in said head and having at least two spaced passages therein, one of which said bit extends through and the other of which includes an engageable surface, and drift key means carried by said head and engaging said engageable surface, thereby forcing said bit into tractile engagement with said firstmentioned surface.

6. In a tool holder, a body having a surface formed on one end thereof conforming to and adapted to partially embrace a tool bit, a slot extending from said surface into said body, a hole in said body substantially parallel to and spaced apart from said surface, a plate member adapted to be positioned in said slot, spaced parallel holes formed in said plate, one of said holes being adapted to accommodate said bit and the other of said holes being in axial alignment with the hole in said body when said surface is contacted by said bit, and locking means positioned in the axially aligned holes for moving said plate to a position where said last holes are misaligned, thereby forcing said tool bit against said surface.

7. In a tool holder, a body having a surface formed on one corner thereof conforming to and adapted to partially embrace a tool bit, a hole extending from said surface into said body angular with respect to a central vertical plane therein, a hole extending downwardly into said body in spaced parallel relation to said surface and crossing said first hole, a cylindrical clamping member slidably positioned in said first hole and having spaced holes therein the axes of which are parallel, one of said holes being shaped to receive said bit and the other having a surface therein to be engaged for locking said bit into tractile engagement with said firstmentioned surface, and locking means positioned in the downwardly extending hole in said body and having a portion thereof in cooperative relation with said second-mentioned surface for locking said bit as aforesaid.

8. In a tool holder, a body having an elongated cavity formed in one end thereof, said cavity extending upwardly and having a portion of its surface adapted to cooperate with a portion of the outer surface of a tool bit, a clamping member movably carried on said holder, locking means, clearance means in said clamping member for both said bit and said locking means to extend therethrough, said locking means comprising a rotatable screw having a conical portion integral therewith and operatively engaging said clamping member for moving the latter in a direction to wedge said bit against said first surface, said screw also having its axis substantially parallel to the axis of said bit and acting against said clamping member in a direction opposite to the cutting edge of said tool bit to force said bit into positive engagement with said first mentioned surface portion, whereby said bit is solidly held against said body, and backing up means adjustably supported in said body with upper end contacted by the lower end of said bit.

9. In a tool holder, a body having an elongated upwardly extending cavity formed in one end thereof a portion of the surface of which is adapted to partially embrace a tool bit, a passage formed in said body angular with respect to said surface, a clamping member movably carried in said passage and having clearance means extending therethrough and through which said bit passes, and locking means in said body comprised of a screw-propelled rotative cone having its axis substantially parallel to the axis of said bit and acting against said clamping member at a point therein which is spaced apart from said tool bit to force it in a direction opposite to the cutting edge of said bit, thereby forcing said bit into positive engagement with the surface of said body, and backing up means adjustably supported in said body with its upper end contacted by the lower end of said bit.

10. In a tool holder, a body having an elongated upwardly extending cavity formed in one end thereof and conforming to a portion of the surface of a tool bit to be used in said holder, a tool embracing member carried by said holder, a screw having its axis extending generally in the direction of the axis of said bit and having a tapered shank portion cooperating with said embracing member and adapted to be rotated to cause said member to move in a direction to rigidly force said tool bit against said surface, and backing-up means adjustably supported in said body with its upper end in contact with the lower end of said bit.

11. In a tool holder, a body having a shank portion and a head portion, said head portion having a surface formed therein extending upwardly at an angle approaching the vertical plane to cooperate with a portion of the outer surface of a tool bit, a clamping member movably carried on said head and adapted to engage a tool bit, screw means extending at least partially into said head and having its axis at least approaching parallelism with the axis of said bit and having a rotatable tapered portion engaging said clamping member and acting against the latter in a direction to force said bit into positive engagement with at least a portion of said surface, thereby imparting in effect the rigidity of said head to said bit.

12. A toolholder for holding a work insert of elongated form and uniform cross-section comprising, a head recessed to accommodate said insert, the inner walls of the recess being shaped to fit the inner sides of said insert and extending to the top of the head on the side of the insert opposite that from which major working stresses are directed, a movable piece having means shaped to embrace the outer sides of the insert at two substantially opposite points adjacent its working end and means for moving said piece in a direction to hold said insert against said inner walls, said moving means being a screw threadingly engaging said toolholder, movable into and out of the top thereof and provided with a tapered part adapted to bear against and move the piece.

13. A toolholder according to claim 12 in which said screw is provided also with a cylindrical part adapted to bear against a part of the head.

SOLON A. STERNBERGH.
CHARLES S. KNABB.

References Cited in the file of this patent

UNITED STATES PATENTS

| Number    | Name     | Date          |
|-----------|----------|---------------|
| 1,282,984 | Thompson | Oct. 29, 1918 |
| 2,107,835 | Pierce   | Feb. 8, 1938  |
| 2,223,191 | Sperbeck | Nov. 26, 1940 |
| 2,421,162 | Quindry  | May 27, 1947  |
| 2,431,852 | Weld     | Dec. 2, 1947  |

FOREIGN PATENTS

| Number  | Country       | Date          |
|---------|---------------|---------------|
| 174,575 | Great Britain | May 11, 1922  |
| 234,828 | Switzerland   | Feb. 16, 1945 |
| 417,950 | Germany       | Aug. 20, 1925 |
| 460,156 | Germany       | May 19, 1926  |
| 488,746 | France        | July 19, 1918 |
| 494,973 | Germany       | Mar. 31, 1930 |
| 565,126 | France        | Jan. 19, 1924 |